United States Patent
Nakatani (10) Patent No.: US 9,738,214 B2
(45) Date of Patent: Aug. 22, 2017

(54) HEADLIGHT CONTROLLER AND VEHICLE HEADLIGHT SYSTEM

(71) Applicant: Stanley Electric Co., Ltd., Tokyo (JP)

(72) Inventor: Akihiro Nakatani, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 204 days.

(21) Appl. No.: 14/340,329

(22) Filed: Jul. 24, 2014

(65) Prior Publication Data
US 2015/0055357 A1    Feb. 26, 2015

(30) Foreign Application Priority Data

Aug. 23, 2013  (JP) .................................. 2013-172977

(51) Int. Cl.
*G08G 1/16* (2006.01)
*B60Q 1/14* (2006.01)
*F21S 8/10* (2006.01)

(52) U.S. Cl.
CPC .......... *B60Q 1/143* (2013.01); *F21S 48/1154* (2013.01); *F21S 48/1258* (2013.01); *F21S 48/1747* (2013.01); *B60Q 2300/056* (2013.01); *B60Q 2300/122* (2013.01); *B60Q 2300/41* (2013.01); *B60Q 2300/42* (2013.01); *B60Q 2300/43* (2013.01)

(58) Field of Classification Search
CPC combination set(s) only.
See application file for complete search history.

(56) References Cited

U.S. PATENT DOCUMENTS

| 8,251,560 B2 | 8/2012 | Ohno et al. |
| 8,373,182 B2 | 2/2013 | Seko et al. |

(Continued)

FOREIGN PATENT DOCUMENTS

| JP | 2010-232081 A | 10/2010 |
| JP | 2011-20559 A | 2/2011 |

(Continued)

OTHER PUBLICATIONS

Japanese Office Action for the related Japanese Patent Application No. 2013-172977 dated Apr. 24, 2017.

*Primary Examiner* — Brian Zimmerman
*Assistant Examiner* — Cal Eustaquio
(74) *Attorney, Agent, or Firm* — Kenealy Vaidya LLP (57) ABSTRACT

A headlight controller and a vehicle headlight system including an ADB and AFS can include a headlight controller and an optical unit. The headlight controller can include a system controller and a camera photographing vehicles located in a travelling direction of a subject vehicle, and the system controller can be configured to output a control signal to provide favorable light distribution patterns by using image data output from the camera in accordance with traffic conditions. The optical unit can be configured to emit beam lights using lights emitted from a first and second light-emitting device via a projector lens so that the beam lights can be used as a high/low beam without movable parts. Thus, the disclosed subject matter can include providing vehicle headlight systems that can form various favorable light distribution patterns by utilizing the characteristics of the controller and the optical unit in accordance with the traffic conditions.

19 Claims, 8 Drawing Sheets

(56) References Cited

U.S. PATENT DOCUMENTS

| | | | |
|---|---|---|---|
| 2003/0025597 A1* | 2/2003 | Schofield | B60Q 1/346 340/435 |
| 2008/0007429 A1* | 1/2008 | Kawasaki | G01J 1/4228 340/905 |
| 2013/0242100 A1 | 9/2013 | Seki | |

FOREIGN PATENT DOCUMENTS

| | | | | |
|---|---|---|---|---|
| JP | 2012-151058 A | 8/2012 | | |
| JP | 2012-162121 A | 8/2012 | | |
| JP | EP 2525302 A1 * | 11/2012 | | G06K 9/00825 |
| JP | 2013-82390 A | 5/2013 | | |

* cited by examiner

FIG. 4a  Exemplary Embodiment

FIG. 4b  Comparative Embodiment

HEADLIGHT CONTROLLER AND VEHICLE HEADLIGHT SYSTEM

This application claims the priority benefit under 35 U.S.C. §119 of Japanese Patent Application No. 2013-172977 filed on Aug. 23, 2013, which is hereby incorporated in its entirety by reference.

BACKGROUND

1. Field

The presently disclosed subject matter relates to headlight controllers and vehicle headlight systems, and more particularly to vehicle headlight systems including an adaptive driving beam and an adaptive front lighting system using an optical unit, which do not include a movable component with a simple structure and high reliability, and the vehicle headlight systems having favorable light distribution patterns, which can be easy to drive at night can prevent the optical unit from emitting a glare type light to oncoming vehicles and vehicles moving forward on a driving lane.

2. Description of the Related Art

When drivers steer a car at night, the drivers usually want to steer the car while they turn on headlights for a high beam to improve a visibility. However, drivers must drive the car while they switch between the headlights for a high beam and headlights for a low beam in response to various traffic conditions so that the headlights do not emit a glare type light to oncoming vehicles, vehicles moving forward on a same driving lane, etc.

Hence, vehicle headlight systems including an adaptive driving beam (ADB) have been developed. A vehicle headlight system including an ADB, for example, may contribute an improvement of visibility in a forward direction of the vehicle that has the ADB for a driver by detecting an oncoming vehicle, a forward vehicle and the like with a camera incorporated into the vehicle that has the ADB and by emitting a high beam for the driver on an area except regions where the oncoming vehicle and the forward vehicle move.

A conventional headlight system including an ADB is disclosed in Patent Document No. 1 (Japanese Patent Application Laid Open JP 2010-232081). FIGS. 7a to 7e are schematic side cross-sectional views depicting a respective one of operations in a conventional headlight of a vehicle headlight system including the ADB, which is disclosed in Patent Document No. 1. The conventional headlight 70 includes: a light source 71; a projector lens 72 located in a light-emitting direction of the light source 71: and a rotatable shutter 73 located between the light source 71 and the projector lens 72, wherein the headlight 70 forms various light distribution patterns using light emitted from the light source 71 via the projector lens 72 by rotating the rotatable shutter 73 in response to various traffic conditions.

Figure 8A:
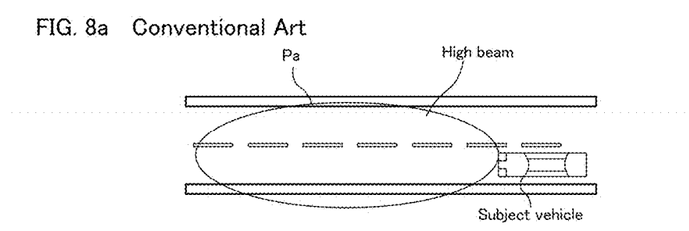
FIG. 8a to FIG. 8e are top views depicting exemplary schematic light distribution patterns, which are formed by the above-described conventional headlight of the vehicle headlight system used in countries where drivers keep to the left side of the road.

FIG. 8a to FIG. 8e are top views depicting exemplary schematic light distribution patterns, which may be formed by the above-described headlight 70 of the headlight system used in countries where drivers keep to the left side of the road. FIG. 8a shows a light distribution pattern Pa for a high beam, when oncoming vehicles and vehicles moving forward on a same driving lane do not exist in a forward direction of a subject vehicle that has the ADB for a driver. In this case, the driver of the subject vehicle may drive on the driving lane while the driver keeps a wide view under the light distribution pattern Pa for a high beam by the headlight 70 shown in FIG. 7a.

Figure 7A:
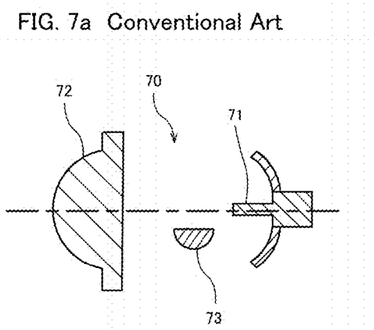
FIG. 7a to FIG. 7e are schematic side cross-sectional views depicting a respective one of operations in a conventional headlight of a vehicle headlight system including an adaptive driving beam (ADB), respectively.
Figure 7B:
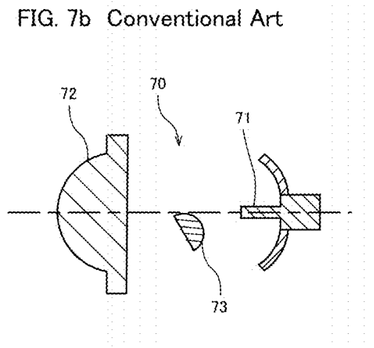
Figure 7C:
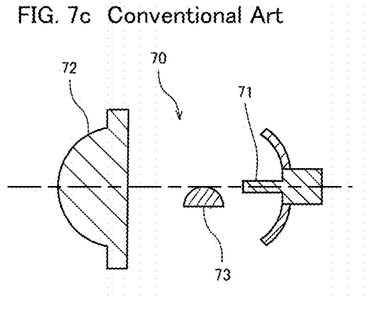
Figure 7D:
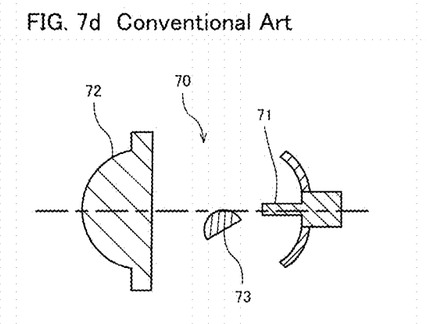
Figure 8B:
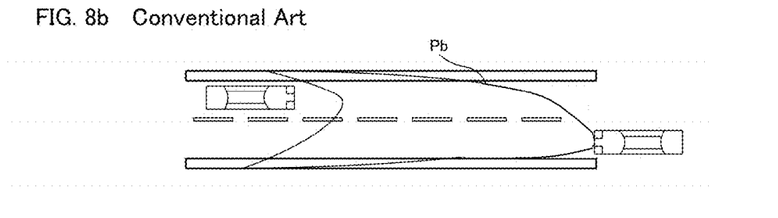

FIG. 8b shows a light distribution pattern Pb for a high beam, when an oncoming vehicle approaches on an oncoming lane in a direction toward the subject vehicle from a long distance. In this case, by rotating the rotatable shutter 73 in the headlight 70 as shown in FIG. 7b, the subject vehicle may drive on the driving lane under the light distribution pattern Pb for a high beam so as not to emit a glare type light to the oncoming vehicle while the driver keeps a wide view under the light distribution pattern Pb for a high beam.

Figure 8C:
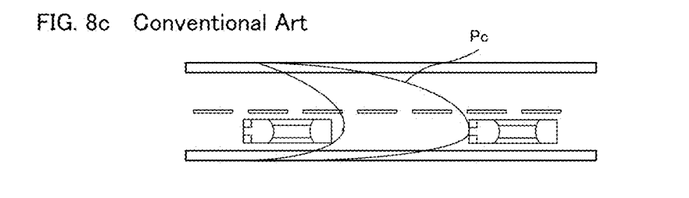

FIG. 8c shows a light distribution pattern Pc for a high beam, when a forward vehicle drives forward on the same driving lane in a forward direction of the subject vehicle from a medium distance. In this case, the subject vehicle may drive on the same driving lane under the light distribution pattern Pc for a high beam so as not to emit a glare type light to the forward vehicle while the driver keeps a wide view under the light distribution pattern Pc for a high beam by rotating the rotatable shutter 73 of the headlight 70 shown in FIG. 7c.

Figure 8D:
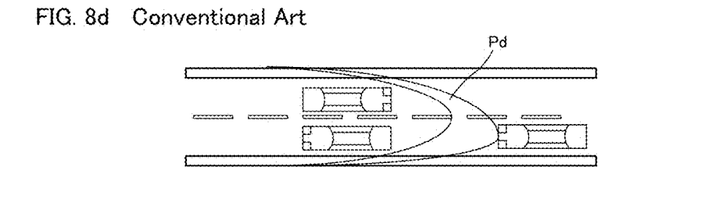

FIG. 8d shows a light distribution pattern Pd for a high beam, when a forward vehicle drives forward on the same driving lane in a forward direction of the subject vehicle from a medium distance and when an oncoming vehicle approaches on the oncoming lane in a direction toward the subject vehicle from a medium distance. In this case, the subject vehicle may drive on the same driving lane under the light distribution pattern Pd for a high beam so as not to emit a glare type light to the forward vehicle and the oncoming vehicle by using the headlight 7d shown in FIG. 7d.

Figure 7E:
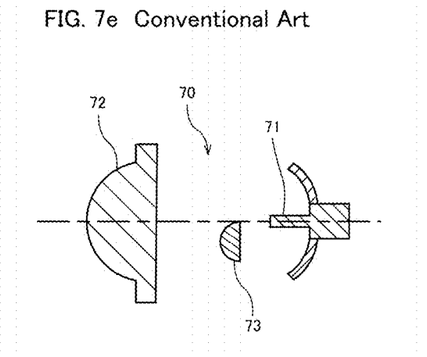
Figure 8E:
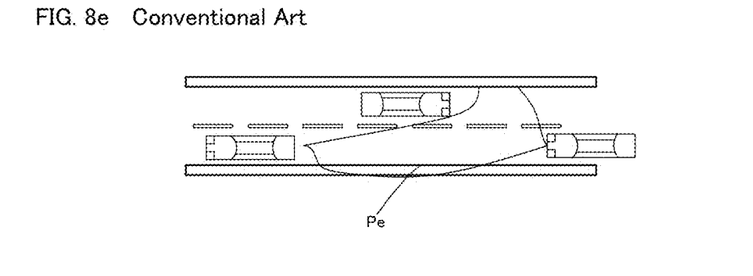

Next, when an oncoming vehicle approaches on the oncoming lane in a direction toward the subject vehicle from a medium distance and when a forward vehicle drives forward on the same driving lane in a forward direction of the subject vehicle from a medium distance, as shown in FIG. 8e, the subject vehicle, which has the ADS for a driver, may provide a light distribution pattern Pe for a low beam so as not to emit a glare type light to the oncoming vehicle and the forward vehicle by the headlight 70 for a low beam shown in FIG. 7e, in which a substantially upward light is shaded by the rotatable shutter 73 while a downward light passes through the projector lens 72. Accordingly, the conventional headlight system including the ADB can provide favorable light distribution patterns using light emitted from the light source 71 via the projector lens 72 by rotating the rotatable shutter 73 in response to various traffic conditions so as not to emit a glare type light to the oncoming vehicle and the forward vehicle, while keeping a wide view for safe driving.

On the other hand, vehicle headlight systems including an adaptive front-lighting system (AFS), which can vary a light-emitting direction of a headlight in accordance with a traveling direction when a subject vehicle turns, have been also developed. The vehicle headlight system including the AFS can improve a visibility of the traveling direction when a subject vehicle turns. Accordingly, vehicle headlight systems including an AFS in addition to an ADB have been becoming a trend in customer needs.

Such a conventional headlight system including an AFS and an ADB is disclosed in, for example, Patent Document No. 2 (Japanese Patent Application Laid Open JP 2012-162121). The conventional headlight system disclosed in Patent Document No. 2 includes actuators to swivel lamp units incorporated into a right and left headlight in a substantially horizontal direction with respect to a road, on which a subject vehicle drives. To operate the actuators, motors, a drive circuit, wiring harnesses and the like are required.

Accordingly, maintenance is required to maintain a good working condition of the right and left headlight, and also conventional headlight systems including an AFS and an ADB may leave a reliability thereof to be improved. Additionally, because the conventional headlight systems including the AFS and an ADB include at least one of the movable parts in the headlight, the headlight systems should become a complex structure. Therefore, the conventional headlight systems may only be incorporated in limited vehicles, because the headlight used for the headlight systems may become big and also may decrease the possibility of car design.

The above-referenced Patent Documents and additional Patent Documents are listed below and are hereby incorporated with their English abstracts and specification in their entireties.
1. Patent Document No. 1: Japanese Patent Application Laid Open JP 2010-232081
2. Patent Document No. 2: Japanese Patent Application Laid Open JP 2012-162121
3. Patent Document No. 3: U.S. Pat. No. 8,373,182
4. Patent Document No. 4: U.S. Patent Publication No. 2013-0242100-A1
5. Patent Document No. 5: U.S. Pat. No. 8,251,560
6. Patent Document No. 6: U.S. Patent Application of Stanley Electric reference No. G14-010

The disclosed subject matter has been devised to consider the above and other problems, characteristics and features. Thus, exemplary embodiments of the disclosed subject matter can include headlight controllers which can provide favorable light distribution patterns to safely drive at night in accordance with various traffic conditions, while preventing a right and left headlight from emitting a glare type light to oncoming vehicles and vehicles moving in a forward direction of a subject vehicle, even when the subject vehicle drives on a big curved road, and even when an oncoming vehicle approaches on an oncoming lane toward the subject vehicle.

In addition, exemplary embodiments of the disclosed subject matter can include vehicle headlight systems including an optical unit with a simple structure, which can be used as the right and left headlight for the above-described headlight controller. The optical unit does not include movable parts such as the conventional headlight, and therefore can expand possibilities for design so as to be able to harmonize with various vehicular designs.

SUMMARY

The presently disclosed subject matter has been devised in view of the above and other characteristics, desires, and problems in the conventional art. An aspect of the disclosed subject matter can include headlight controllers that can output light-emitting control data to provide favorable light distribution pattern to safely drive at night while varying a light distribution pattern and an amount of light in accordance with various traffic conditions. The headlight controller can prevent a right and left headlight from emitting a glare type light to oncoming vehicles and vehicles moving forward on a driving lane of a subject vehicle under the various traffic conditions. Another aspect of the disclosed subject matter can include providing vehicle headlight systems including the headlight controller and an optical unit, which can be used as a right and left headlight having a high reliability for the headlight controller, and which can be easy to reduce a size of the headlight due to no movable part. The vehicle headlight systems can provide a favorable light distribution pattern that can be easy to drive at night for not only the subject vehicle but also vehicles traveling near the subject vehicle by utilizing the characteristics of the headlight controller and the optical unit.

According to an aspect of the disclosed subject matter, a headlight controller including an ADB and an AFS can include: a camera being located adjacent a subject vehicle having a right and left headlight, configured to photograph at least one vehicle located in a forward direction of the subject vehicle, and being configured to output the vehicle photographed by the camera as image data; a vehicle detector detecting the vehicle in accordance with the image data, detecting locating data of the vehicle with respect to an optical axis of the camera, and configured to output said vehicle locating data as vehicle data; and a light-increasing area detector configured to detect a travelling direction of the subject vehicle by using a rudder angle signal output from the subject vehicle, configured to a light-emitting area in response to the travelling direction, configured to set up a light-increasing area in the light-emitting area in accordance with the travelling direction of the subject vehicle, and configured to output said setup light-emitting area including the light-increasing area as light-increasing area data.

In addition, the headlight controller including an ADB and ASF can also include: a light-emitting area controller configured to detect whether the at least one vehicle exists or not in the travelling direction of the subject vehicle in accordance with the vehicle data output from the vehicle detector, configured to set up the light-emitting area from the light-increasing data output the light-increasing area detector, configured to set up the light-increasing area from the light-increasing data when the vehicle does not exist, configured to set up a non-light-emitting area in the light-emitting area from the light-increasing data when the vehicle exists, and configured to output at least said light-increasing area, said non-light-emitting area and said light-emitting area as light-emitting area data; a light distribution controller configured to receive the light-emitting area data, and configured to output a light-emitting control signal to the right and left headlight in accordance with the light-emitting area data; and wherein an amount of light on the light-increasing area emitted from the right and left headlight of the object vehicle is configured to become larger than another amount of light emitted on the light-emitting area, where is located other than the light-increasing area and the non-light-emitting area.

In the above-described exemplary headlight controllers, the light-emitting area controller can be configured to judge whether the vehicle exists or not, by judging whether the vehicle is or not on the light-increasing area, and also can judge whether that the vehicle exists or not, by judging whether the vehicle is or not on a prescribed area with reference to the travelling direction of the subject vehicle. In this case, the travelling direction of the subject vehicle can be set up at a plurality of different angles, and the camera is a color camera, which photographs color image data. The light-increasing area detector can be configured to judge that the vehicle exists by extracting at least one of a headlight of an oncoming vehicle and a tail lamp of a front vehicle driving forward in a forward direction of the subject vehicle, and also can judge the traveling direction by comparing the rudder angle signal with a plurality of prescribed values.

According to another aspect of the disclosed subject matter, vehicle headlight systems including an ADB and an AFS can replace the right and left headlight of the headlight controllers described above with a right and left optical unit. Each of the right and left optical unit can include at least one of a first light-emitting device having a first light-emitting surface for a low beam and a second light-emitting device having a second light-emitting surface for a high beam, and an LED drive circuit emitting at least one of the first light-emitting device and the second light-emitting device. In this case, features immediately described can be included in the vehicle headlight systems.

In the above-described exemplary vehicle headlight systems including an ADB and an ASF, the vehicle headlight systems further can include a first projector lens located in front of the first light-emitting surface of the first light-emitting device so that an optical axis of the first projector lens intersects with the first light-emitting surface of the first light-emitting device, and a second projector lens located in front of the second light-emitting surface of the second light-emitting device so that an optical axis of the second projector lens intersects with the second light-emitting surface of the second light-emitting device. The first light-emitting device can include at least one white LED aligning in a substantially horizontal direction with reference to the road, on which the subject vehicle drives, and the second light-emitting device can include a plurality of white LEDs arranged in a matrix array shape in a substantially horizontal direction with reference to the road. In this case, the first light-emitting device can be integrated into the second light-emitting device, and thereby each of the right and left optical unit can include only the second light-emitting device without the first light-emitting device.

According to the aspects, the light-emitting area controller can be configured to output the light-emitting area data including a light-emitting area, a light-increasing area in the light-emitting area and a non-light-emitting area to the light distribution controller in accordance with various traffic conditions. Therefore, the disclosed subject matter can provide the headlight controllers that can change to a favorable light distribution pattern to safely drive at night in accordance with various traffic conditions while preventing the right and left headlight from emitting a glare type light to oncoming vehicles and vehicles moving forward on a driving lane of the subject vehicle under the various traffic conditions.

Furthermore, the optical units of the headlight system can be used as the right and left headlight having a high reliability with a simple structure without a movable part for the headlight controllers. Thus, the disclosed subject matter can also provide vehicle headlight systems using the headlight controller and the optical units, which can provide a favorable light distribution pattern that can be easy to drive at night for the subject vehicle and other vehicles traveling near the subject vehicle by utilizing the characteristics of the headlight controller and the optical unit.

BRIEF DESCRIPTION OF THE DRAWINGS

These and other characteristics and features of the disclosed subject matter will become clear from the following description with reference to the accompanying drawings, wherein:

FIG. 3b is a schematic side cross-sectional view showing a locating relation between a second left light-emitting device and a second left projector lens in the left optical unit shown in FIG. 3a;

DETAILED DESCRIPTION OF EXEMPLARY EMBODIMENTS

Figure 1:
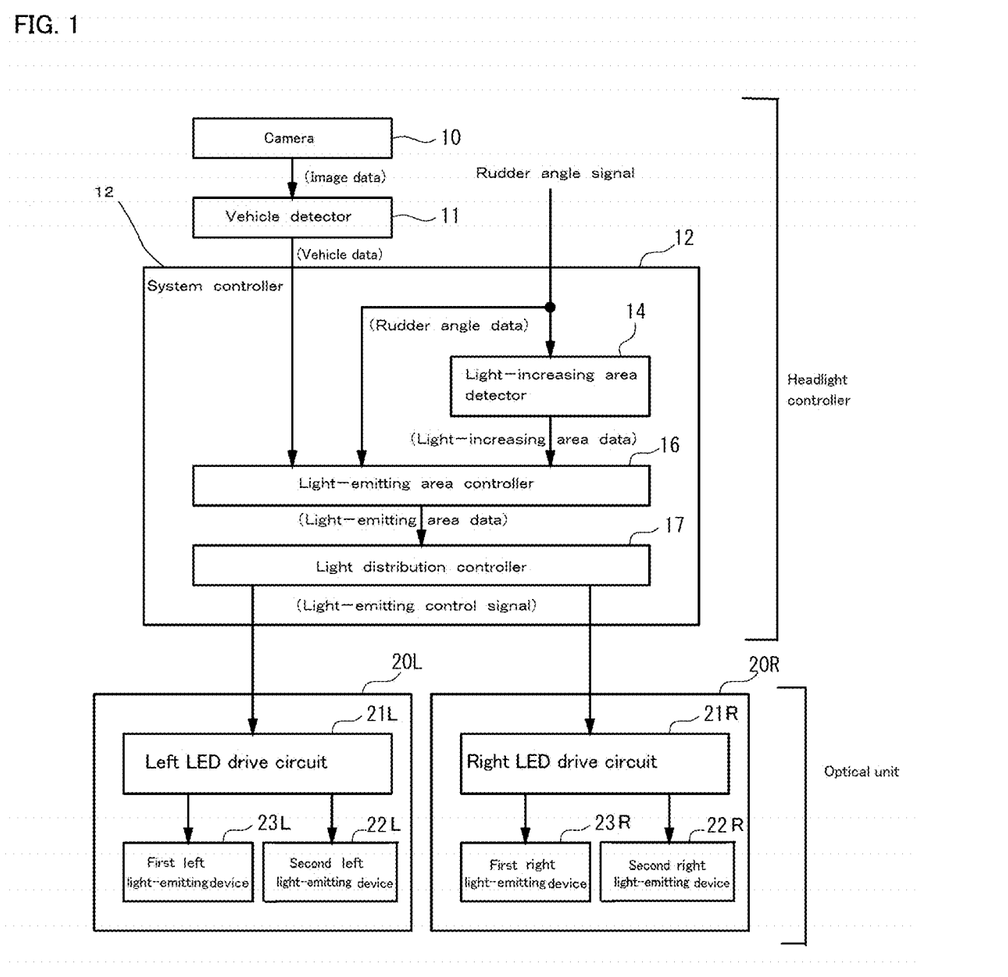
FIG. 1 is a block diagram showing an exemplary embodiment of a vehicle headlight system including a headlight controller and a right and left optical unit made in accordance with principles of the disclosed subject matter.

The disclosed subject matter will now be described in detail with reference to FIG. 1 to FIG. 6. FIG. 1 is a block diagram showing an exemplary embodiment of a vehicle headlight system including a headlight controller and a right and left optical unit made in accordance with principles of the disclosed subject matter. The vehicle headlight system can include the headlight controller and the right and left optical unit 20R and 20L, which can be used as a right and left headlight for a subject vehicle incorporating the headlight controller.

The headlight controller can include: a camera 10 having an optical axis CA (as described with reference to FIG. 6 later) located at a predetermined position in a forward direction of the subject vehicle (e.g., close to a vehicle interior mirror), photographing an objective space in the forward direction of the subject vehicle, configured to photograph at least one vehicle located in the forward direction of the subject vehicle, and the camera 10 configured to output the at least one vehicle photographed by the camera 10 as image data; a vehicle detector 11 detecting the at least one vehicle in accordance with the image data output from the camera 10, detecting locating data of the at least one vehicle with respect to the optical axis CA of the camera 10, and being configured to output said locating vehicle data as vehicle data; and a system controller 12 configured to receive the vehicle data output from the vehicle detector 11, configured to receive a rudder angle signal output from the subject vehicle, and being configured to output a light-emitting control signal to the right and left optical unit 20R and 20L, which can be used as a right and left headlight for a subject vehicle incorporating the headlight controller.

The system controller 12 can includes: a light-increasing area detector 14 detecting a travelling direction of the subject vehicle in accordance with rudder angle data of a handle of the subject vehicle output from the subject vehicle, configured to set up a light-emitting area in response to the travelling direction, and being configured to set up an area where the right and left optical unit 20R and 20L should increase an amount of light in the light-emitting area, which may be emitted by the right and left optical unit 20R and 20L, in accordance with the travelling direction of the subject vehicle as light-increasing area data; and a light-emitting area controller 16 configured to determine a light-emitting area and an amount of light as light-emitting area data in accordance with the vehicle data output from the vehicle detector 11 and being configured to output the light-emitting area data, wherein the light-emitting area controller 16 is configured to set up a relatively larger amount of light on a light-increasing area in the light-emitting area, where is determined by the light-emitting area controller 16, than an amount of light emitted on a light-emitting area other than the light-increasing area when the at least one vehicle does not exist in a forward direction of the subject vehicle in at least one of the image data and the vehicle data.

In addition, the system controller 12 can also include a light distribution controller 17 configured to receive the light-emitting area data output from the light-emitting area controller 16, configured to determine a light-emitting control signal in accordance with the light-emitting data including the light-emitting area and the amount of light, and being configure to output the light-emitting control signal to the optical unit 20R and 20L.

Next, the exemplary system structure of the disclosed subject matter and each operation of above-described elements will be described in more detail. As the camera 10, a charge coupled device (CCD) camera in which CCDs are arranged in a matrix array shape, a complementary metal-oxide semiconductor (CMOS) in which CMOSs are arranged in a matrix array shape and the like can be used to photograph the objective space in the forward direction of the subject vehicle. These cameras are generally provided with a projector lens to focus the objective space on each of the CCDs and the CMOSs and to protect each of the CCDs and the CMOSs from an external environment. The optical axis CA of the camera 10 can correspond to an optical axis of the projector lens.

The vehicle detector 11 can include a computer system include a central processing unit (CPU), a read-only memory (ROM), a random access memory (RAM) and the like, and can be operated to extract the at least one vehicle included in the image data output from the camera 10 by running a program from the ROM while using the camera 10. In this case, the vehicle detector 11 can detect only the at least one vehicle by a geometric feature extraction and the like, and then can also detect at least one of a headlight, a taillight, s stop lamp, a position lamp and the like as one of the first vehicle data in the at least one vehicle by an optical feature extraction, etc. Thereby, the vehicle detector 11 can keep detect locating data of the at least one vehicle with respect to the optical axis CA of the camera 10 as the vehicle data. The vehicle detector 11 can be integrated into the camera 10, and also can be integrated into the system controller 12, which will now be described.

The system controller 12 can also include a computer system include a central processing unit (CPU), a read-only memory (ROM), a random access memory (RAM) and the like, and can be operated as a controller for the right and left optical unit 20R and 20L by running a program from the ROM while operating the camera 10 and the vehicle detector 11.

The at least one vehicle means oncoming vehicles and forward vehicles driving forward in a forward direction of the subject vehicle incorporating the vehicle headlight system on a same driving lane. In this case, the vehicle detector 11 can detect an oncoming vehicle by recognizing at least one of a headlight and a position lamp, and also can detect a forward vehicle driving forward in a forward direction of the subject vehicle by extracting at least one of a taillight and a stop lamp.

When a color camera (e.g., CCD camera including a color filter) is used as the camera 10, the vehicle detector 13 may be easy to detect whether the at least one vehicle is an oncoming vehicle or not because a taillight and a stop lamp emit red color light and a headlight and a position lamp emit light having a substantially white color tone. Additionally, an oncoming vehicle has features such that may approach toward the subject vehicle on an oncoming lane located adjacent a driving lane, and such that an approaching speed should be fast as compared with a forward vehicle driving forward on a same driving lane, on which the subject vehicle drives.

On the other hand, the forward vehicle driving forward on the same driving lane may have features such that an amount of movements in a horizontal direction with respect to the driving lane may be small and such that an approaching speed between the forward vehicle and the subject matter should be very slow as compared with the oncoming vehicle. Accordingly, the vehicle detector 11 may be easy to detect whether the at least one vehicle is an oncoming vehicle or not by using a plurality of the above-described features.

The light-increasing area detector 14 can detect the travelling direction of the subject vehicle in accordance with the rudder angle data of a handle of the subject vehicle output from the subject vehicle. In this case, when the rudder angle is a positive value, the light-increasing area detector 14 may determine that the handle of the subject vehicle steers to the left, and also the light-increasing area detector 14 may determine that the handle steers to the right, when the rudder angle is a negative value. Then the light-increasing area detector 14 can output the light-increasing area data to the light-emitting area controller 16 in accordance with the travelling direction of the subject vehicle.

The light-emitting area controller 16 can receive at least the light-increasing area data and the vehicle data output from the vehicle detector 11, and can determine a favorable light-emitting area and an appropriate amount of light. Then the light-emitting area controller 16 can be configured to output the light-emitting area data to the light distribution controller 17, which can be configured to output the light-emitting control signal to the right and left optical unit 20R and 20L.

The right optical unit 20R can include a first right light-emitting device 23R, a second right light-emitting device 22R and a right LED drive circuit 21R to drive the first and second right light-emitting device 23R and 22R. Similarly, the left optical unit 20L can include a first left light-emitting device 23L, a second left light-emitting device 22L and a left LED drive circuit 21L to drive the first and second left light-emitting device 23L and 22L.

Figure 2:
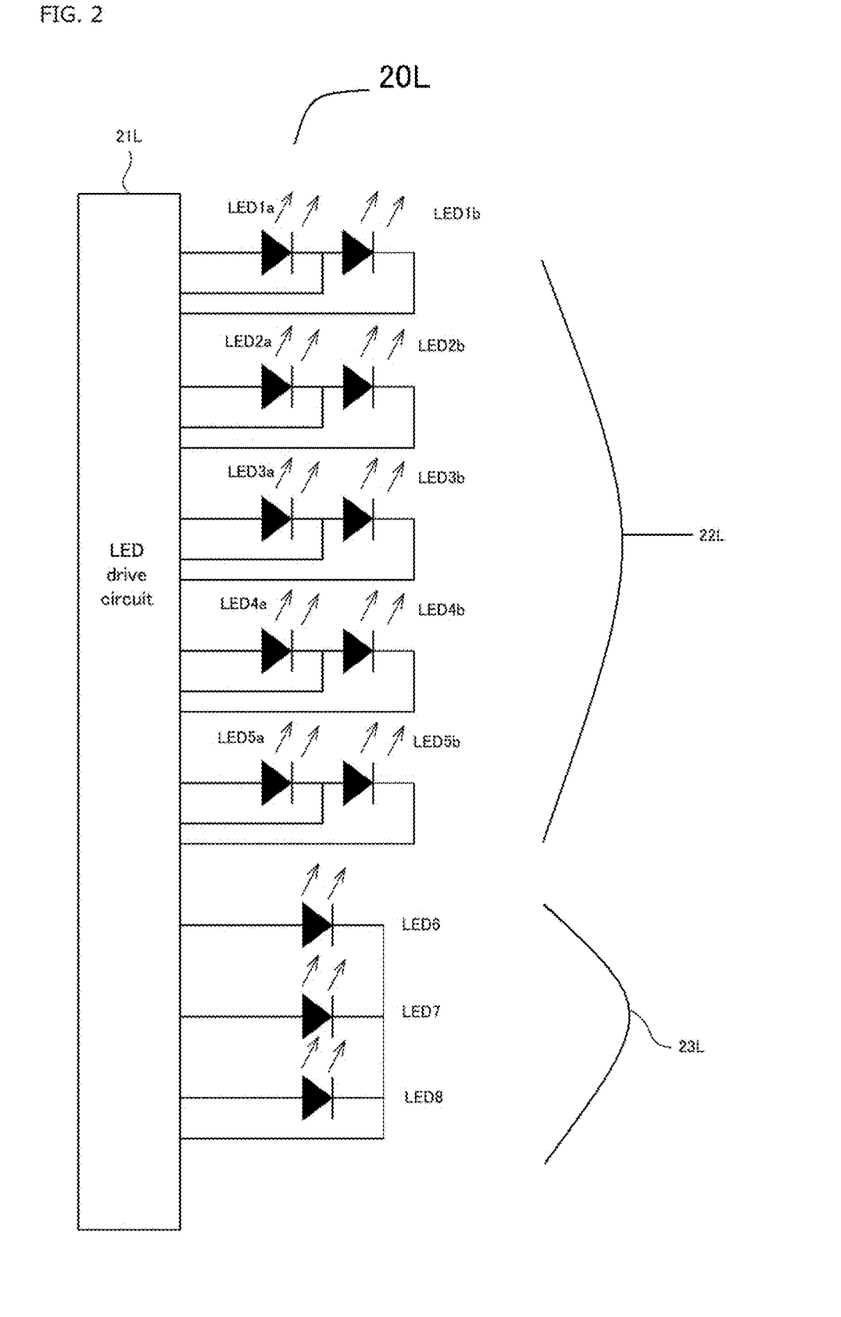
FIG. 2 is a circuit diagram showing an exemplary left optical unit including a first left light-emitting device, a second left light-emitting device and a left LED drive circuit in the vehicle headlight system shown in FIG. 1.

FIG. 2 is a circuit diagram showing an exemplary left optical unit 20L including the first left light-emitting device 23L, the second left light-emitting device 22L and the left LED drive circuit 21L in the vehicle headlight system shown in FIG. 1. The right optical unit 20R is abbreviated in FIG. 2 because it is a substantially same structure as the left optical unit 20L, and the left optical unit 20L will now be described in detail. The first left light-emitting device 23L can include a single LED having a substantially white color tone to be used as a low beam for a right headlight, and also include a plurality of white LEDs having a substantially same white color tone, which align in a horizontal direction with respect to a road. For example, the first left light-emitting device 23L can include three white LEDs LED6, LED7 and LED8, which can be independently drown by the left LED drive circuit 21L, respectively.

The second left light-emitting device 22L can include a plurality of white LEDs having a substantially same white color tone, which are arranged in a matrix array shape and in a horizontal direction with respect to a road in order to be used as a high beam for a left headlight. For example, the second left light-emitting device 22L can include ten white LEDs LED1a to LED5b, which are arranged in two rows and five columns, and which can be independently drown by the left LED drive circuit 21L, respectively. As LED1a to LED8, a semiconductor light-emitting device such that is disclosed in Patent Document No. 3 can be used.

Figure 3A:
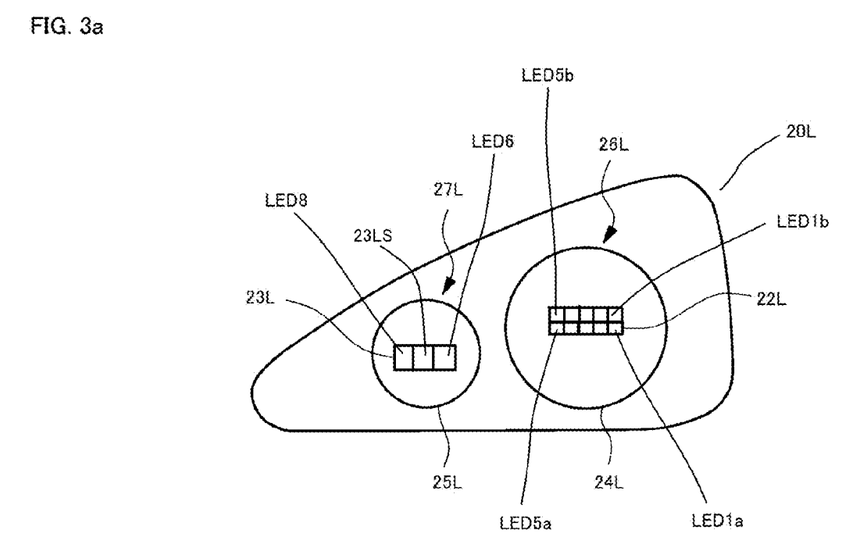
FIG. 3a is a schematic front view depicting the left optical unit.

FIG. 3a is a schematic front view depicting the left optical unit 20L including a left low beam optical unit 27L used as a low beam and a left high beam optical unit 26L used as a high beam. The plurality of white LEDs having a substantially same white color tone LED6 to LED8 of the first left light-emitting device 23L can align in a substantially horizontal direction with respect to a road so that the left low beam optical unit 27L can provide a light distribution pattern used as a low beam.

In addition, each of LED1a to LED5a and LED1b to LED5b arranged in two rows and five columns can also align in a substantially horizontal direction with respect to a road. Thereby, the right and left optical unit 20R and 20L can provide favorable light distribution patterns in accordance with various traffic conditions by using the light-emitting control signal output from the light distribution controller 17, which can receive the light-emitting area data output from the light-emitting area controller 16.

Figure 3B:
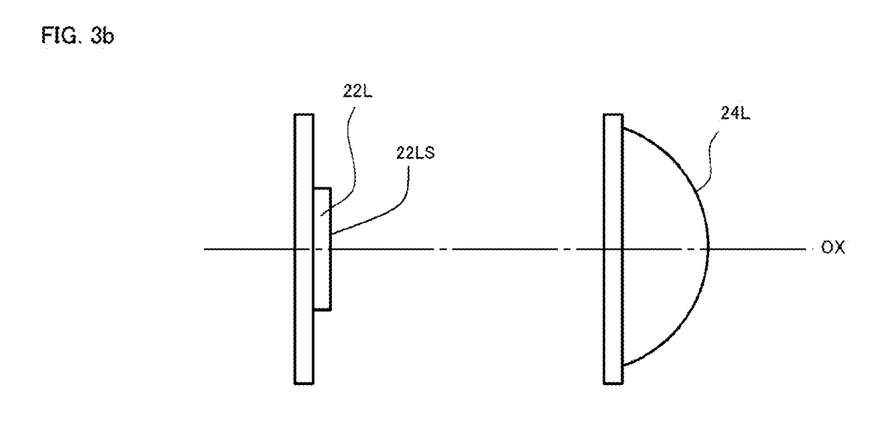

FIG. 3b is a schematic side cross-sectional views showing a locating relation between the second left light-emitting device 22L and a second left projector lens 24L having an optical axis OX in the left high beam optical unit 26L. The left high beam optical unit 26L can include the second left projector lens 24L and the second left light-emitting device 22L located in front of the projector lens 24 so that a light-emitting surface 22LS of the second left light-emitting device 22L faces an incident surface of the projector lens 24L and the optical axis OX of the second left projector lens 24L intersects with the light-emitting surface 22LS of the second left light-emitting device 22L.

When each of LED1a to LED5b arranged in two rows and five columns is the semiconductor light-emitting device disclosed in Patent Document No. 3, because a reflective material surrounds a light-emitting surface of the semiconductor light-emitting device, the left high beam optical unit 26L can prevent each of LED1a to LED5b from an optical interference between the adjacent LEDs. Accordingly, the right and left optical unit 20R and 20L can provide favorable light distribution patterns having a clear boundary for a safe driving in accordance with various traffic conditions by using the light-emitting control signal output from the light distribution controller 17.

Similarly, the left low beam optical unit 27L can also include a first left projector lens 25L and the first left light-emitting device 23L located in front of the first left projector lens 25L so that a light-emitting surface 23LS of the first left light-emitting device 23L faces an incident surface of the first left projector lens 25L and an optical axis of the first left projector lens 25L intersects with the light-emitting surface 23LS of the first left light-emitting device 23L. Thereby, the right and left optical unit 20R and 20L can provide favorable light distribution patterns for a low beam, and also can provide favorable light distribution patterns having a clear boundary to drive safely in accordance with various traffic conditions while the first left projector lens 25L associates with the left high beam optical unit 26L.

In this case, the first left light-emitting device 23L can be integrated into the second left light-emitting device 22L so as to be aligned with the second left light-emitting device 22L in a substantially horizontal direction with reference to a road, on which the subject vehicle drives. Thereby, the right and left optical unit 20R and 20L can provide various favorable light distribution patterns including a light distribution pattern for a low beam in accordance with various traffic conditions by using the light-emitting control signal output from the light distribution controller 17, as disclosed in Patent Document No. 4 by Applicant of this disclosed subject matter.

In addition, as the right and left optical unit 20R and 20L, a vehicle headlight using a semiconductor light source and a mirror, which can provide various light distribution patterns disclosed in Patent Document No. 5 by Applicant of this disclosed subject matter, can also be used. The above-described structure of the optical unit is also disclosed in Patent Document No. 6 by Applicant of this disclosed subject matter.

Figure 4A:
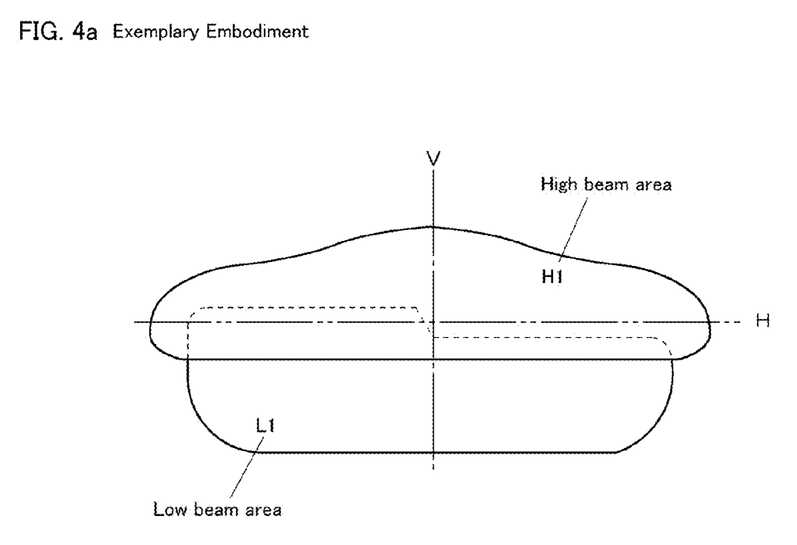
FIG. 4a is a schematic front view showing an exemplary light-emitting area including a high beam and a low beam formed by the vehicle headlight system including the headlight controller and the right and left optical unit shown in FIG. 1.
Figure 4B:
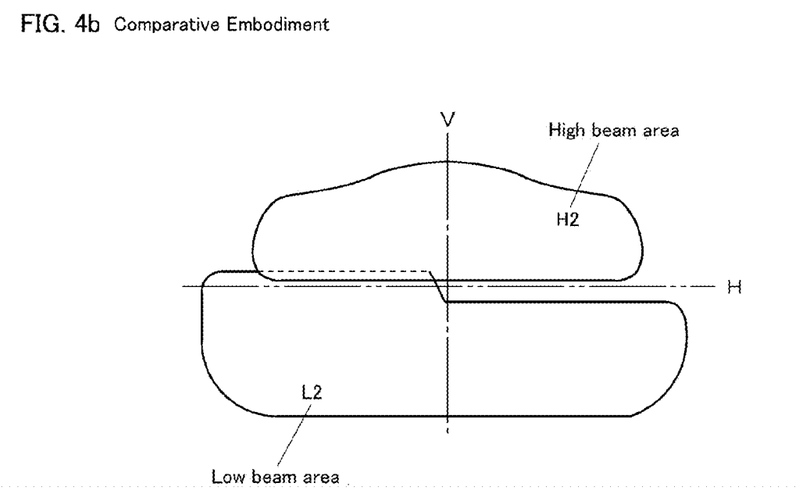
FIG. 4b is a schematic front view showing a comparative light-emitting area including a high beam and a low beam.

FIG. 4 is a schematic front view showing an exemplary light-emitting area including a high beam and a low beam formed by the vehicle headlight system including the headlight controller and the right and left optical unit 20R and 20L shown in FIG. 1, and FIG. 4b is a schematic front view showing a comparative light-emitting area including a high beam and a low beam. According to the light-emitting area of an exemplary embodiment, the low beam unit (mark 27L shown in FIG. 3a and a right low beam unit is abbreviated in FIG. 3a due to a substantially symmetrical appearance) of the optical unit 20R and 20L can form a low beam area L1, which extends in a horizontal direction under a substantially horizontal line H.

In more detail, the low beam area L1 can be located under the horizontal line H in a rightward direction of a vertical line V so as not to emit a glare type light to oncoming vehicles approaching on an oncoming lane toward the subject vehicle of a driving lane, and can slightly project on the horizontal line H in a leftward direction of the vertical line V to improve a visibility for a driver of the subject vehicle. Additionally, the high beam unit (mark 26L shown in FIG. 3a and a right high beam unit is abbreviated in FIG. 3a) of the optical unit 20R and 20L can form a high beam area H1, which extends in a wider horizontal direction and in a relatively upward direction of the low beam area than the horizontal direction of the low beam area L1.

The high beam area H1 can include a light-emitting area, which extends in upward direction near the vertical line V in the high beam area H1 as show in FIG. 4a. The high beam area H1 can be divided into a plurality of light-emitting areas by selecting each emission of the LEDs arranged in a matrix array shape of the second right and left light-emitting device 22R and 22L. Thereby, the vehicle headlight system including the right and left optical unit 20R and 20L can change to a favorable light distribution patterns in response to various traffic conditions.

When the exemplary light-emitting area formed by the vehicle headlight system is compared with a comparative embodiment shown in FIG. 4b, because the comparative embodiment includes an area where a low beam area L2 and a high beam area H2 do not overlap, the area may cause a reduction of visibility for a driver. The high beam area H2 may never be a favorable light distribution pattern because it may be narrower than the high beam area H1 of the exemplary embodiment. However, the high beam area H1 of the exemplary embodiment can become a wide light distribution pattern while overlapping with the low beam area. Accordingly, the headlight system including the right and left optical unit 20R and 20*l* of the disclosed subject matter can provide various favorable light distribution patterns in accordance with the traffic conditions.

Figure 5:
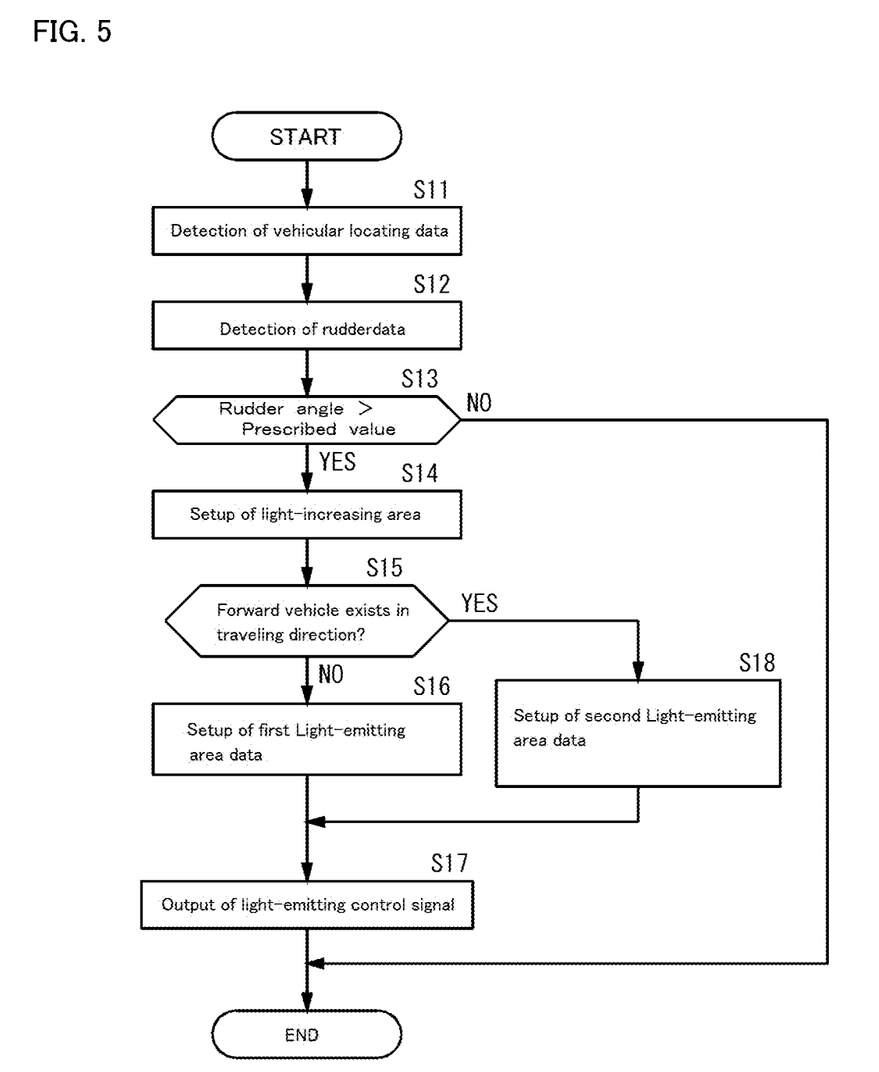
FIG. 5 is a flow chart showing an exemplary operating procedure for the vehicle headlight system shown in FIG. 1.

Here, an exemplary basic operation of the vehicle headlight system including the ADB and the AFS will be described with reference to a schematic flow chart in FIG. 5. When a driver of an object vehicle turns on the headlight system at night, the vehicle detector 11 can judge whether vehicles exist or not in frontward direction of the object vehicle in accordance with the image data output from the camera 10. When the vehicle detector 11 judges that the vehicle does not exist, the light-emitting area controller 16 may basically instruct the light distribution controller 17 to emit all the light-emitting devices 23R, 22R, 23L and 22L.

When the vehicle detector 11 judges that at least one vehicle exists, the light-emitting area controller 16 can output the light-emitting area data including a light-emitting area and a non-light-emitting area to the light distribution controller 17 in accordance with the vehicle data output from the vehicle detector 11. The light distribution controller 17 can output the light-emitting control signal to the right and left optical unit 20R and 20L in accordance with the light-emitting area data output from the light-emitting area controller 16 so as not to emit a glare type light to the at least one vehicle.

In this case, until the light-emitting area controller 16 detects that the vehicle moves or until the light-increasing area detector 14 detects that the road varies, the light distribution controller 17 may keep outputting the above-described light-emitting control signal to the optical unit 20R and 20L. When the vehicle detector 11 detects that the vehicle moves, the light-emitting area controller 16 can input the vehicle data including the vehicular locating data from the vehicle detector 11 (Step S11). Next, the light-increasing area detector 14 can input the rudder angle data output from the subject vehicle (Step S12).

The light-increasing area detector 14 detects whether the road, on which the subject vehicle drives, is a rightward/leftward curved road or not by comparing the rudder angle data of the road with a prescribed value described later (Step S13). When the road is not the rightward/leftward curved road, that is to say, a straight road, the operation can jump to "END" and can return to "START" of the flow chart shown in FIG. 5 (Step S13: NO).

When the light-increasing area detector 14 judges that the road, on which the subject vehicle drives, is a rightward/leftward curved road (Step S13: YES), the light-increasing area detector 14 can detect the travelling direction of the subject vehicle in accordance with the rudder angle data, and can set up the light-increasing area where the right and left optical unit 20R and 20L should increase a relatively amount of light as compared with the light-emitting area, in accordance with the travelling direction (Step S14).

The light-emitting area controller 16 judges whether at least one forward vehicle exists in a travelling direction of the subject vehicle. When the at least one forward vehicle does not exist in the travelling direction of the subject vehicle (STEP S15: NO), the light-emitting area controller 16 can be configured to set up the light-increasing area, the light-increasing area and each of amounts of light to be emitted on the light-increasing area and the light-increasing area in response to the travelling direction of the subject vehicle as first light-emitting area data, and can be configured to set up each of the amounts of light so that an amount of light, which is emitted on the light-increasing area, is larger than that of light, which is emitted on the light-increasing area (STEP S16).

The light distribution controller 17 can create a light-emitting control signal in accordance with the first light-emitting area data, which are set up by the light-emitting area controller 16. Then the light distribution controller 17 can output the light-emitting control signal to the right and left optical unit 20R and 20L so that the optical unit 20R and 20L can emit each of the amounts of light on the light-increasing area and the light-increasing area, respectively.

On the other hand, when the at least one forward vehicle exists in the travelling direction of the subject vehicle (STEP S15: YES), the light-emitting area controller 16 can be configured to set up a light-emitting area, a non-light-emitting area and an amount of light to be emitted on the light-emitting area in response to the travelling direction of the subject vehicle as second light-emitting data, so that the right and left optical unit 20R and 20L does not emit a glare type light to the at least one forward vehicle.

The light distribution controller 17 can create the light-emitting control signals in accordance with the first light-emitting area data and the second light-emitting data, which are set up by the light-emitting area controller 16. Then the light distribution controller 17 can output the light-emitting control signals to the right and left optical unit 20R and 20L so that the optical unit 20R and 20L can emit various favorable light distribution patterns in accordance with the traffic conditions.

The prescribed value described in Step S13 above can be used to whether the road, on which the subject vehicle drives, is a rightward/leftward curved road or not. Specifically, for example, when the rudder angle data of the road is more than +20 degrees, the light-increasing detector 14 may judge that the subject vehicle turns leftward on a leftward curved road. When the rudder angle data of the road is less than −20 degrees, the light-increasing detector 14 may judge that the subject vehicle turns rightward on a rightward curved road.

In addition, when the rudder angle data of the road is between +20 degrees and −20 degrees, the light-increasing detector 14 may judge that the subject vehicle drives forward on a substantially straight road. In these cases, by setting up a plurality of prescribed values, the light-increasing area detector 14 can finely detects whether the road, on which the subject vehicle drives, is a large rightward/leftward curved road, or a medium rightward/leftward curved road, or a small large rightward/leftward curved road or a straight road. Thereby, the headlight system can provide more favorable light distribution patterns in accordance with various traffic conditions.

Moreover, the light-emitting area controller 16 to judge whether the at least one vehicle exists or not, for example, may judge that the at least one vehicle exists when the vehicle is on a light-increasing area where is set up by the light-increasing area detector 14, and also may judge that the at least one vehicle does not exist when the vehicle is not on the light-increasing area. When the light-increasing detector 14 judges that the road, on the subject vehicle drives, is a rightward/leftward curved road, the light-emitting area controller 16 may judge that the at least one vehicle exists when the vehicle is on a prescribed area in the travelling direction of the subject vehicle, and also may judge that the at least one vehicle does not exist when the vehicle is not on the prescribed area in the travelling direction of the subject vehicle.

Thereby, the light-emitting area controller 16 can manipulate a part of the image data output from the camera 10, which may include the at least one vehicle in the vehicle data output from the vehicle detector 11 at an appropriate interval by a timer interrupt procedure, etc. Accordingly, algorithms described above can reduce a processing time to judge whether the at least one vehicle exists or not As described above, when the light-increasing detector 14 judges that the road is a substantially straight road and when the light-emitting area controller 16 judges that the at least one vehicle does not exist in a forward direction of the subject vehicle, the light distribution controller 17 can enable the optical unit 20R and 20L to form a light distribution pattern including a light-increasing area, where a relatively large amount of light emits in the forward direction of the subject vehicle. When the light-increasing area detector 14 judges that the road is a curved road and when the light-emitting area controller 16 judges that the at least one vehicle does not exist in traveling direction of the subject vehicle, the light distribution controller 17 can enable the optical unit 20R and 20L to form a light distribution pattern including a light-increasing area, where a relatively large amount of light emits in the travelling direction of the subject vehicle.

Figure 6:
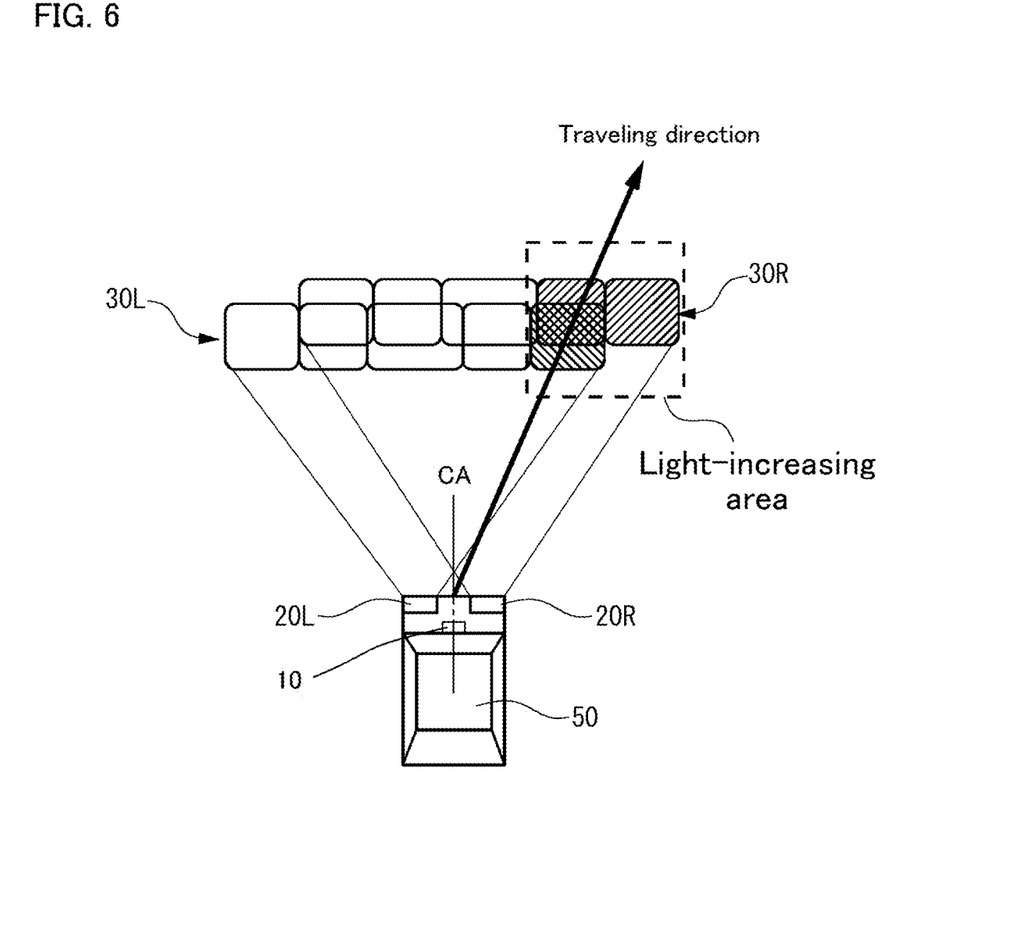
FIG. 6 is a schematic drawing depicting an exemplary light-emitting performance of the vehicle headlight system shown in FIG. 1.

FIG. 6a is a schematic drawing depicting an exemplary light-emitting performance of the vehicle headlight system shown in FIG. 1. The vehicle headlight system can include the camera having the optical axis CA and the right and left optical unit 20R and 20L, which include the second right light-emitting device 22R and the second left light-emitting device 22L for a high beam. In order to facilitate understandings of the light-emitting performance of the right and left optical unit 20R and 20L here, the light-emitting performance will now be described using a right and left schematic light distribution patterns 30R and 30L, which are projected by a respective one of LED1a to LED5a in the right and left optical unit 20R and 20, respectively.

The respective one of LED1a to LED5a in the right and left optical unit 20R and 20 can independently project as the right and left light distribution patterns 30R and 30L, which align in substantially parallel with each other in a horizontal direction. In this case, a respective one of five patterns of the right and left light distribution patterns 30R and 30L can vary a light intensity independently by changing a current flowing into the respective one of LED1a to LED5a in the right and left optical unit 20R and 20L.

For example, when a subject vehicle 50 turns to the right, a light-increasing area can be determined in accordance with a travelling direction of the subject vehicle 50, and two diagonal region of the right light distribution pattern 30R and one diagonal region of the left light distribution pattern 30L can be set up as the light-increasing area. When no vehicles exists in the travelling direction of the subject vehicle, the right and left optical unit 20R and 20L can be driven by the right and left LED drive circuit 21R and 21L in accordance with a light-emitting control signal output from the light distribution controller 17 so that an amount of light emitted on the respect one of the light-increasing area becomes larger than that emitted on each of other areas.

In this case, when an oncoming vehicle appears in the travelling direction of the subject vehicle, the above-described light-increasing area can vary from the light-emitting area having a large amount of light to the non-light-emitting area. Thereby, a drive of the subject vehicle can drive under the low beam using the right and left low beam optical unit 27L and the high beam expect the non-light-emitting area using the right and left high beam optical unit 26L so as not emit a glare type light to the oncoming vehicle.

According to the exemplary vehicle headlight, the exemplary headlight controller can provide a favorable light distribution pattern to safely drive at night while preventing a right and left headlight from emitting a glare type light to oncoming vehicles and vehicles moving forwards in a forward direction of the subject vehicle in accordance with various traffic conditions, and while increasing an amount of light emitted in a travelling direction of the subject vehicle when no forward vehicle exists in the travelling direction.

Furthermore, the right and left optical unit 20R and 20L can be used as the right and left headlight having a high reliability for the headlight controller, and can be easy to reduce a size of the headlight due to no movable part. Thus, the disclosed subject matter can provide vehicle headlight systems using the headlight controller and the optical units can provide a favorable light distribution pattern that can be easy to drive at night for not only the subject vehicle but also vehicles traveling near the subject vehicle by utilizing the characteristics of the headlight controller and the optical unit, and which can expand possibilities for design so as to be able to harmonize with various vehicular designs.

Various modifications of the above disclosed embodiments can be made without departing from the spirit and scope of the presently disclosed subject matter. For example, cases where the right and left optical unit 20R and 20L is used as the right and left headlight including a high beam and a low beam are described. However, the right and left optical unit 20R and 20L is not limited to this structure and can be integrally incorporated into a high beam and a low beam. In addition, cases where each of the second right and left light-emitting device 22 R and 22*l* includes a plurality of LEDs arranged in matrix array shape having two rows and five columns, is described as a matter of convenience. However, the plurality of LEDs is not limited to this location and can be arranged in matrix array shape having various rows and columns, and also can be arranged in a staggered array shape, etc.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A vehicle headlight system including an adaptive driving beam (ADB) and an adaptive front lighting system (AFS), comprising:

a right and left optical unit each including at least one of a first light-emitting device having a first light-emitting surface for a low beam and a second light-emitting device having a second light-emitting surface, and an LED drive circuit emitting at least one of the first light-emitting device and the second light-emitting device, wherein the first light-emitting device includes at least one white LED aligning in a substantially horizontal direction with reference to the road, on which the subject vehicle drives, and thereby projects light emitted from the first light-emitting device under a substantially horizontal line so as to extend in the substantially horizontal direction, and the second light-emitting device includes a plurality of white LEDs arranged in a matrix array shape in the substantially horizontal direction with reference to the road, and thereby projects light emitted from the second light-emitting device in an upward direction of the substantially horizontal line while overlapping the light projected by the first light-emitting device near the substantially horizontal line, wherein each of at least continuous five projecting regions in the substantially horizontal direction is independently projected by the LED drive circuit:

a camera having an optical axis being located adjacent a subject vehicle having the right and left headlight, configured to photograph at least one vehicle located in a forward direction of the subject vehicle, and the camera being configured to output the at least one vehicle photographed by the camera as image data;

a vehicle detector detecting the at least one vehicle in accordance with the image data output from the camera, detecting locating data of the at least one vehicle with respect to the optical axis of the camera, and being configured to output said vehicle locating data as vehicle data;

a light-increasing area detector configured to detect a travelling direction of the subject vehicle by using a rudder angle signal output from the subject vehicle, configured to determine a light-emitting area in response to the travelling direction of the subject vehicle, configured to set up a light-increasing area in the light-emitting area in accordance with the travelling direction of the subject vehicle, and configured to output said setup light-emitting area including the light-increasing area as light-increasing area data;

a light-emitting area controller configured to detect whether the at least one vehicle exists or not in the travelling direction of the subject vehicle in accordance with the vehicle data output from the vehicle detector, configured to set up the light-emitting area from the light-increasing data output from the light-increasing area detector, configured to set up the light-increasing area from the light-increasing data when the vehicle does not exist, and configured to output at least said light-increasing area and said light-emitting area as light-emitting area data;

a light distribution controller configured to receive the light-emitting area data output from the light-emitting area controller, and configured to output a light-emitting control signal to the right and left optical unit of the subject vehicle in accordance with the light-emitting area data output from the light-emitting area controller; and wherein an amount of light on the light-increasing area emitted from the right and left headlight of the subject vehicle is configured to become larger than another amount of light emitted on the light-emitting area, where is located other than the light-increasing area and a non-light-emitting area, when the light-increasing area detector judges that a road, on which the subject vehicle drives, is a rightward/leftward curved road.

2. The vehicle headlight system including an ADB and an AFS according to claim 1, wherein the light-emitting area controller is configured to judge whether the at least one vehicle exists or not, by judging whether the vehicle is or not on the light-increasing area where is set up by the light-increasing area detector.

3. The vehicle headlight system including an ADB and an AFS according to claim 1, wherein the light-emitting area controller judges whether that the vehicle exists or not, by judging whether the vehicle is or not on a prescribed area with reference to the travelling direction of the subject vehicle.

4. The vehicle headlight system including an ADB and an AFS according to claim 1, wherein the travelling direction of the subject vehicle is set up at a plurality of different angles.

5. The vehicle headlight system including an ADB and AFS according to claim 1, wherein the camera is a color camera, which photographs color image data.

6. The vehicle headlight system including an ADB and AFS according to claim 1, wherein the light-increasing area detector is configured to judge that the at least one vehicle exists by extracting at least one of a headlight of an oncoming vehicle and a tail lamp of a front vehicle driving forward in a forward direction of the subject vehicle from the vehicle data output from the vehicle detector.

7. The vehicle headlight system including an ADB and an AFS according to claim 1, wherein the light-increasing area detector judges the traveling direction of the subject vehicle by comparing the rudder angle signal with a plurality of prescribed values.

8. A vehicle headlight system including an ADB and AFS, comprising:

a right and left optical unit each including at least one of a first light-emitting device having a first light-emitting surface for a low beam and a second light-emitting device having a second light-emitting surface, and an LED drive circuit emitting at least one of the first light-emitting device and the second light-emitting device, wherein the first light-emitting device includes at least one white LED aligning in a substantially horizontal direction with reference to the road, on which the subject vehicle drives and thereby projects light emitted from the first light-emitting device under a substantially horizontal line so as to extend in the horizontal direction, and the second light-emitting device includes a plurality of white LEDs arranged in a matrix array shape in the substantially horizontal direction with reference to the road, and thereby projects light emitted from the second light-emitting device in an upward direction of the substantially horizontal line while overlapping the light projected by the first light-emitting device near the substantially horizontal line, wherein each of at least continuous five projecting regions in the substantially horizontal direction is independently projected by the LED drive circuit:

a camera having an optical axis being located adjacent a subject vehicle having the right and left optical unit, configured to photograph at least one vehicle located in a forward direction of the subject vehicle, and the camera being configured to output the at least one vehicle photographed by the camera as image data;

a vehicle detector detecting the at least one vehicle in accordance with the image data output from the camera, detecting locating data of the at least one vehicle with respect to the optical axis of the camera, and being configured to output said vehicle data as vehicle data;

a light-increasing area detector configured to detect a travelling direction of the subject vehicle by using a rudder angle signal output from the subject vehicle, configured to determine a light-emitting area in response to the travelling direction of the subject vehicle, configured to set up a light-increasing area in the light-emitting area in accordance with the travelling direction of the subject vehicle, and configured to output said setup light-emitting area including the light-increasing area as light-increasing area data;
a light-emitting area controller configured to detect whether the at least one vehicle exists or not in the travelling direction of the subject vehicle in accordance with the vehicle data output from the vehicle detector, configured to set up the light-emitting area from the light-increasing data output from the light-increasing area detector, configured to set up a non-light-emitting area in the light-emitting area from the light-increasing data when the vehicle exists, and configured to output at least said light-increasing area, said non-light-emitting area and said light-emitting area as light-emitting area data;
a light distribution controller configured to receive the light-emitting area data output from the light-emitting area controller, and configured to output a light-emitting control signal to the right and left optical unit of the subject vehicle in accordance with the light-emitting area data output from the light-emitting area controller; and
wherein an amount of light on the light-increasing area emitted from the right and left optical unit of the subject vehicle is configured to become larger than another amount of light emitted on the light-emitting area, where is located other than the light-increasing area and the non-light-emitting area, when the light-increasing area detector judges that a road, on which the subject vehicle drives, is a rightward/leftward curved road.

9. The vehicle headlight system including an ADB and an AFS according to claim 8, wherein the light-emitting area controller is configured to judge whether the at least one vehicle exists or not, by judging whether the vehicle is or not on the light-increasing area where is set up by the light-increasing area detector.

10. The vehicle headlight system including an ADB and an AFS according to claim 8, wherein the light-emitting area controller judges whether that the vehicle exists or not, by judging whether the vehicle is or not on a prescribed area with reference to the travelling direction of the subject vehicle.

11. The vehicle headlight system including an ADB and an AFS according to claim 8, wherein the travelling direction of the subject vehicle is set up at a plurality of different angles.

12. The vehicle headlight system including an ADB and AFS according to claim 8, wherein the camera is a color camera, which photographs color image data.

13. The vehicle headlight system including an ADB and an AFS according to claim 8, wherein the light-increasing area detector is configured to judge that the at least one vehicle exists by extracting at least one of a headlight of an oncoming vehicle and a tail lamp of a front vehicle driving forward in a forward direction of the subject vehicle from the vehicle data output from the vehicle detector.

14. The vehicle headlight system including an ADB and an AFS according to claim 8, wherein the light-increasing area detector judges the traveling direction of the subject vehicle by comparing the rudder angle signal with a plurality of prescribed values.

15. The vehicle headlight system including an ADB and an AFS according to claim 8, further comprising:
a first projector lens having an optical axis being located in front of the first light-emitting surface of the first light-emitting device, and the optical axis of the first projector lens intersecting with the first light-emitting surface of the first light-emitting device; and
a second projector lens having an optical axis being located in front of the second light-emitting surface of the second light-emitting device, and the optical axis of the second projector lens intersecting with the second light-emitting surface of the second light-emitting device.

16. The vehicle headlight system including an ADB and AFS according to claim 8, wherein the right and left optical unit projects a part of the light emitted from the second light-emitting device on the light-increasing area when the light-increasing area detector judges that a road, on which the subject vehicle drives, is a rightward/leftward curved road and when the rudder angle of the curved road is larger than a prescribed angle.

17. The vehicle headlight system including an ADB and an AFS according to 1, wherein the right and left optical unit projects a part of the light emitted from the second light-emitting device on the light-increasing area when the light-increasing area detector judges that a road, on which the subject vehicle drives, is a rightward/leftward curved road and when the rudder angle of the curved road is larger than a prescribed angle.

18. The vehicle headlight including an ADB and AFS according to claim 8, wherein the right and left optical unit projects a part of the light emitted from the second light-emitting device on the light-increasing area.

19. The vehicle headlight including an ADB and AFS according to claim 1, wherein the right and left optical unit projects a part of the light emitted from the second light-emitting device on the light-increasing area.

* * * * *